United States Patent [19]

Lauer et al.

[11] 4,355,231
[45] Oct. 19, 1982

[54] REMOTE ANALYSIS USING THERMAL RADIATION

[75] Inventors: James L. Lauer, Ballston Lake; Keyser K. Lau, Troy, both of N.Y.

[73] Assignee: Suncor Inc., Toronto, Canada

[21] Appl. No.: 178,954

[22] Filed: Aug. 25, 1980

[51] Int. Cl.³ .............................................. G01V 5/00
[52] U.S. Cl. ................................... 250/253; 250/341
[58] Field of Search ............... 250/253, 255, 304, 341; 73/154, 355 R

[56] References Cited

U.S. PATENT DOCUMENTS

| | | |
|---|---|---|
| 2,648,010 | 8/1953 | Smith . |
| 2,972,251 | 2/1961 | Harper ............................ 250/253 X |
| 3,032,655 | 5/1962 | Romans . |
| 3,066,797 | 12/1962 | Fraenkel . |
| 3,097,744 | 7/1963 | Hutter et al. . |
| 3,278,746 | 10/1966 | Fiat .................................... 250/253 |
| 3,356,211 | 12/1967 | Mathews . |
| 3,496,350 | 2/1970 | Bray ............................... 250/255 X |
| 3,539,807 | 11/1970 | Bickel . |
| 3,631,246 | 12/1971 | Defriez . |
| 3,762,546 | 10/1973 | Keitel et al. . |
| 3,783,284 | 1/1974 | McCormack . |
| 3,899,213 | 8/1975 | Fantasia et al. . |
| 3,926,522 | 12/1975 | Andreotti . |
| 3,962,403 | 6/1976 | Wyslouzil . |
| 3,992,287 | 11/1976 | Rhys . |
| 4,236,640 | 12/1980 | Knight . |

FOREIGN PATENT DOCUMENTS

| | | |
|---|---|---|
| 275970 | 2/1929 | United Kingdom . |
| 1393061 | 5/1975 | United Kingdom . |

OTHER PUBLICATIONS

"A Laser in the Sky May Help Stop Polluters", *Chemical Week*, Jun. 13, 1979, pp. 29-30.

*Primary Examiner*—Davis L. Willis
*Attorney, Agent, or Firm*—J. Edward Hess; Donald R. Johnson; Paul Lipsitz

[57] ABSTRACT

A method for remote analysis of a mixture of materials where one of the components has thermal characteristics different from the other components. In a preferred embodiment, tar sands on a moving belt or dropping into a hopper are irradiated with infrared radiation and the radiant thermal flux of the heated tar sands is remotely detected and measured to determine bitumen content.

9 Claims, 2 Drawing Figures

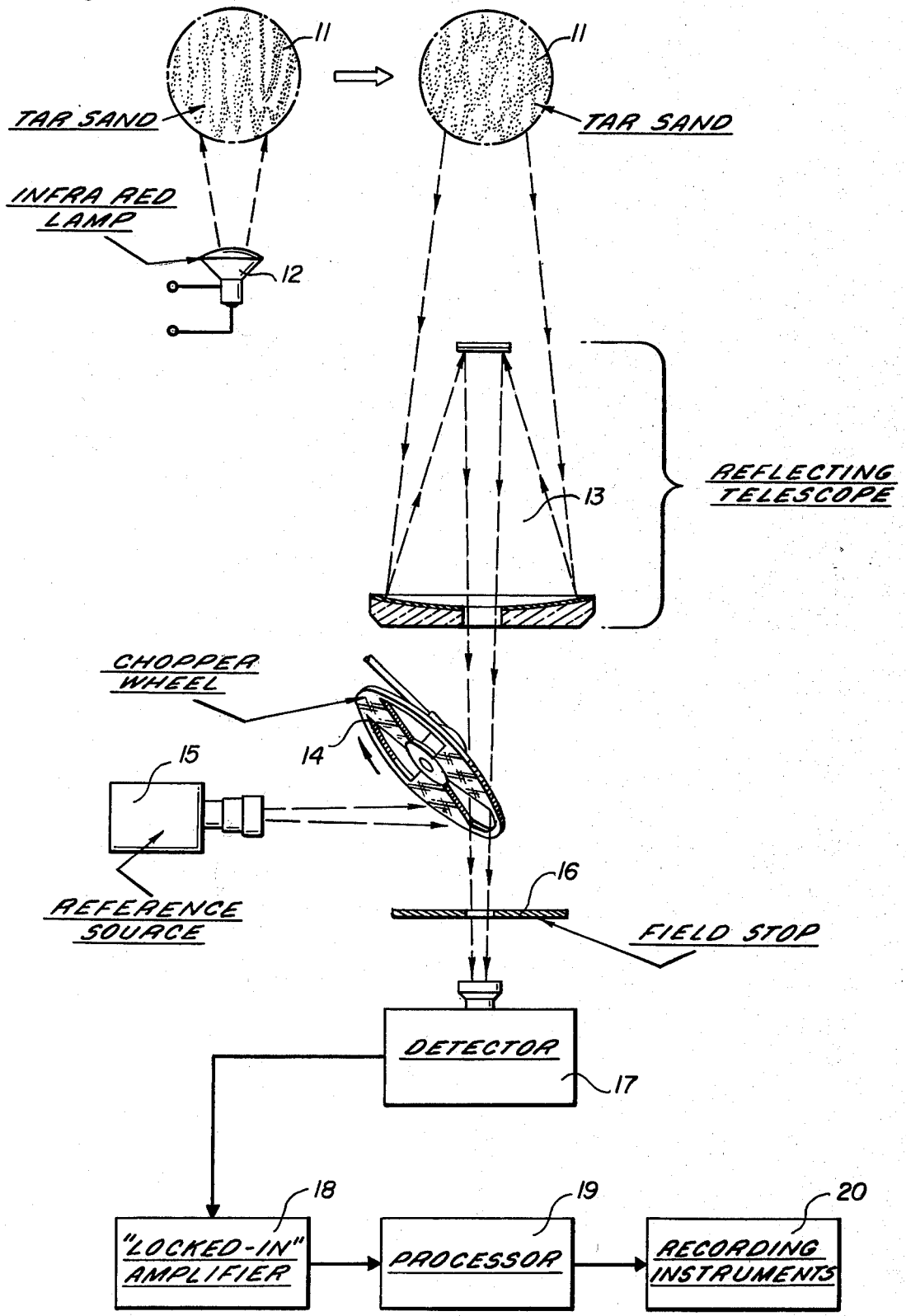

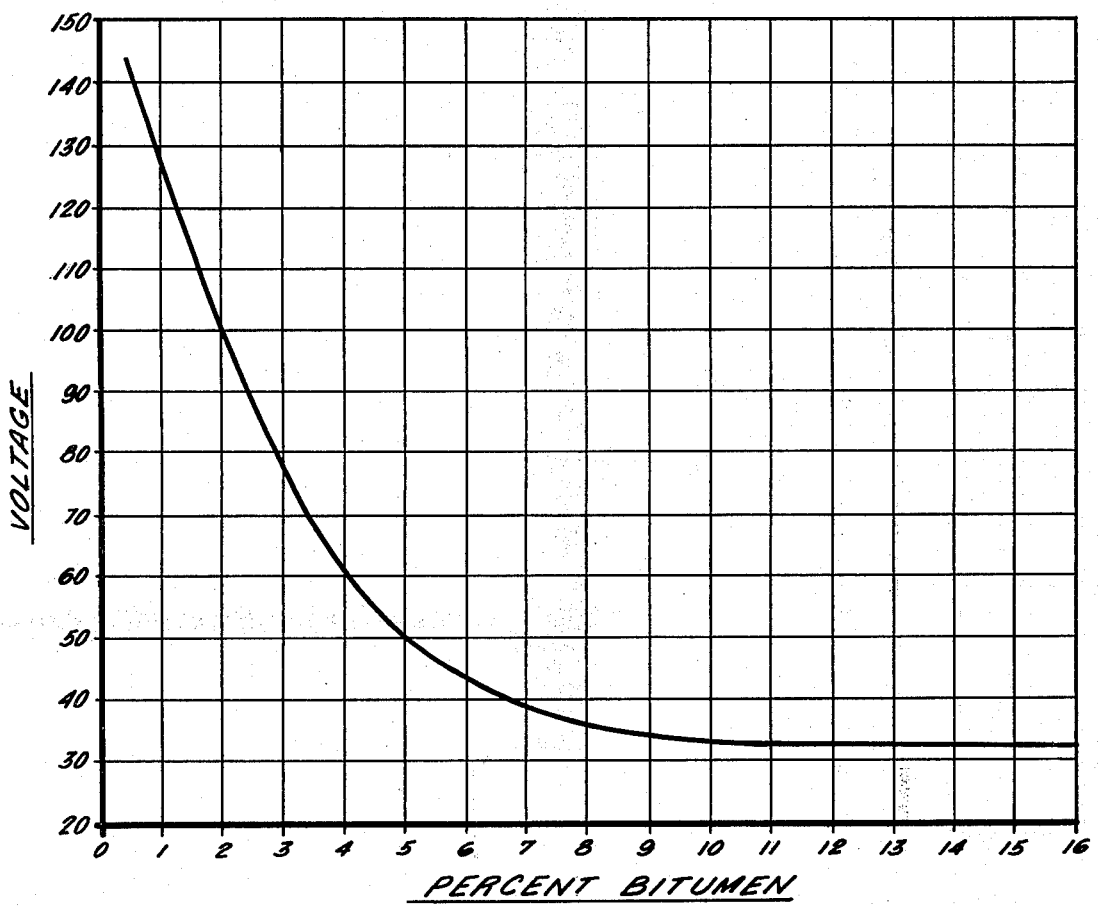

REMOTE ANALYSIS USING THERMAL RADIATION

This invention relates to analytical means for remote analysis of mixtures where one component has thermal characteristics different from the other components. One preferred embodiment of the invention provides for hydrocarbon analysis and is particularly concerned with bitumen in tar sands although the method is useful also for analysis of organic materials in other substrates such as shale, coal, lignite and the like. For illustration purposes the method will be discussed in terms of its application to tar sands. Tar sands are processed for the recovery of hydrocarbons by complex oil extracting and refining methods. After mining the tar sands they are conveyed, often by conveyor belt, to the processing units and it is important to know if the hydrocarbon content of the material is sufficient for proper processing in the equipment. This invention enables analysis of the tar sands to be remotely obtained.

It is known in the art to detect hydrocarbons by remote sensing. For example, U.S. Pat. No. 3,899,213 discloses remote identification of a marine oil spill by directing laser pulses onto the spill to cause fluorescence and measuring the fluorescence with appropriate detector devices. The method is sufficiently sensitive to enable identification of the type of oil and thus, possibly, the source of the spill. See also *Chemical Week*, June 13, 1979 pages 29-30 which describes the method.

In a similar method U.S. Pat. No. 3,032,655 describes the detection from an airplane of hydrocarbon leaks in a pipeline by measuring the infrared radiation on a selected wave length from a solar source.

U.S. Pat. No. 3,631,246 employs taking an infrared spectrum with a spectrophotometer on a prepared sample of recovered, hydrocarbon-contaminated sylvite and using a calibration curve to measure the impurity concentration.

In U.S. Pat. No. 3,926,522 a far-infrared radiant meter is described for measuring the emissions of hydrocarbon and exotic fuels and flares in the 3 to 5 and 8 to 13 micron spectral region comprising a bandpass filter, pyroelectric detector, amplifier, demodulator filter and recorder. The system does not use a reference black body thereby eliminating reflective and refractive optics, but uses as a reference the source background and then introduces the target sample into the field of view. The method requires a large radiant contrast with respect to background.

U.S. Pat. No. 3,783,284 discloses a method of detecting petroleum products in a water area by reflected modulated infrared radiation where characteristic wavelength peaks are detected.

U.S. Pat. No. 3,539,807 discloses a target identification method consisting of radiometric techniques using power difference signals of at least two independent wave-lengths to produce a temperature-independent target composition signal. The method assumes uniformity of composition and temperature for the target, though explicitly pointing out "that different materials can differ in temperature by as much as 40° F. as a result of uneven heating in the sunlight". The method uses a black body as a reference.

In the present invention, infrared emissions are employed to determine not merely the presence of a component in a mixture, but also the amount of the component. That is, the method is one which enables a quantitative analysis to be made. The method of the invention also permits the analysis to be made remotely as, for example, while tar sands are being conveyed to processing units and enables any tar sands below established standards for bitumen to be automatically prevented from entering the processing units. More particularly, the method of the invention provides a means for analysis of a bitumen mineral at 0.5% precision up to concentrations of 10% of bitumen and at 2% precision at concentrations of 10–16% of bitumen, about 16% being the upper limit of bitumen in tar sands. Furthermore, it can provide the analysis very quickly.

The method of the invention is based on the thermal diffusivity of bulk materials. Minerals containing organic matter, be they shale, coal strata, or sands, must be porous since the organic matter is located in interstices. When such minerals are heated by conduction the temperature rise at a given point in a given time will be a function primarily of their bulk heat capacity and will be higher with less of the interstices being filled. This temperature therefore provides a rapid means for detecting the proportion of contained organic matter, provided that the heat capacity of the inorganic matter is essentially constant, which it is for the inorganic sand in tar sands.

In accord with the invention, the organic matter (bitumen) in tar sands is determined by raising the temperature of the material, preferably by irradiating the tar sands with infrared radiation for a short time to increase its surface temperature slightly and subsequently detecting the thermal flux, preferably by using a telescope and an infrared detecting device. It will be understood that the temperature of the material being analyzed may be raised by any means; even mechanical agitation is sometimes sufficient to effect a temperature rise of the bitumen in the tar sands. As indicated, however, for uniformity and reliability, an infrared heating source is preferably used. The tar sands being analyzed may be on a moving belt or even dropping into a storage hopper or processing unit as the analysis is performed. Further, the analytical results can be used to divert target tar sands having inadequate bitumen content for special handling and this can be done by operators reacting to the immediate results obtained or by automatic diverter means responding to signals from the analytical system. It is also to be understood that the thermal emission is determined after the heating steps. Thus, in the case of the tar sands being on a moving belt system, the telescope is focussed at a point where the tar sands will pass immediately after irradiation.

Reference is now made to the drawings.

FIG. 1 is a schematic of the apparatus used in the method of the invention.

FIG. 2 is a correlation curve used to relate output signal to bitumen content.

In FIG. 1, the tar sand sample (11) is shown being irradiated with an infrared lamp (12) and then passing into the position at which the reflecting telescope (13) is focused. The radiation from the tar sands passes through the chopper (14) while the reference radiation from a reference source (15) is blocked and vice versa and the radiation then passes through a field stop (16) into the detector (17) and to the "locked-in" amplifier (18) which responds to the difference between the sample and the reference radiation. Suitable processing (19) and recording (20) apparatus is also part of the system as shown.

When the tar sands samples are irradiated with infrared radiation as they move on a belt to the processing units an infrared lamp is preferably used and may be positioned above the belt so that the tar sands pass beneath. Although this infrared source does not emit continuous radiation over most of the spectral region because of absorption by its glass envelope, it nevertheless is quite satisfactory and, surprisingly, may be used without optical filters ahead of the detector and still give very satisfactory results. This is a particular characteristic of the method of this invention in that the radiation being emitted by the sample and detected is not any particular frequency, but is the integrated thermal radiation from the irradiated target. Other infrared sources may, of course, be used such as electrically heated nichrome wire, a carbon, steel or tungsten rod heated to red heat and the like. The radiation from the infrared source is focused onto the moving tar sands samples so as to irradiate an essentially circular area of about 3–5 inches diameter, although this is not critical, but such a spot of irradiation provides a representative sample of the passing tar sands. The time of sample exposure will generally be from about 0.125 seconds to about 20 seconds and the detector system will be appropriately matched to respond. The temperature rise of the irradiated samples will be on the order of from a fraction of a degree (about 0.1° C.) to about 2° C., but generally about 0.5° C.

Field operation usually requires detection of the analytical signal from a distance of at least about 10 to about 100 feet away but, of course, this distance is generally dependent upon the physical size and other parameters of the processing equipment. The detector measures thermal radiation emitted by the sample as a consequence of surface heating for a specified length of time and, as described above, the radiation from the sample is transferred to the detector by a telescope mirror system. It will be understood that as distance from the sample is increased, the sensitivity of the apparatus must be increased.

No focusing is necessary for the signal beam to the sample and therefore very sensitive detection is necessary. The effective solid angle of view can be very small and therefore a wide-aperture reflecting objective is required; e.g., a telescope. This focusing method of detection is more practical for field use than a simple mirror system originating very close to the conveyor belt and is also essential in order to make the analysis independent of the detailed structure of the sample surface. The farther away the telescope mirror from the sample, the flatter the field and the less difference that will be seen between the flat and rugged surfaces of the tar sands samples.

The telescope, at the operating distance, sees not only the sample but most of its surroundings as well. Indeed, most of the time the sample would be at a temperature above that of the detector and therefore radiate to it, but extraneous sources would interfere with the analysis. Furthermore, even if no extraneous hot sources exist, the surroundings would effectively dilute the sample signal and make the analytical procedure less sensitive. It is therefore desirable to prevent radiation from sources other the sample from entering the detector. A simple and effective means to accomplish this is to place a diaphragm at the focal plane of the telescope collecting mirror and make it just the size of the sample image. A field stop, iris diaphragm, or even a hole in a piece of aluminum is suitable.

The radiation from the sample is interrupted by a chopper, preferably a revolving disc type chopper oriented at 45° degrees to the optical path. Radiation from a reference source such as a light bulb at constant and controllable voltage or some other standard black body radiation source is reflected downstream into the optical path alternately with radiation from the sample. The amplifier is "locked-in" to the chopper frequency and phase to respond to only the difference between sample and reference radiation at appropriate instants. This "locked-in" amplifier system enables a high sensitivity to be obtained and makes the system insensitive to fluctuations in the front end of the electronics system.

A suitable or preferable detector for the radiant flux from the irradiated samples is a lithium tantalate crystal which has the property of changing polarization with temperature as long as the temperature is below the characteristic Néel temperature. Other detectors such as mercury cadmium telluride, lead sulfide, a golay detector, a thermopile, a bolometer, and the like are also useful. In field use the sensing system should be located in an area of rather constant temperature as well as of little vibration.

It is also desirable to have an output signal recording or a data display in the system. For the collection of numerous readings a suitable data acquisition system or any recording device with computational facilities will be desirable. A strip chart recorder may also be used to provide hard copy output providing it has a response time matched to the detector.

In order to obtain the analytical results by the method of this invention an empirical correlation between percent bitumen and detector output, preferably as voltage, is established from tar sands samples of known bitumen content as determined by chemical analysis. FIG. 2 is a graph of such a correlation with the system described above and shown in FIG. 1 and by use of such a graph the percent bitumen can be quickly and remotely determined.

As indicated, the method of the invention will be of general utility to remotely determine the amount of a component in a mixture where the component to be determined has thermal characteristics different from the other components. Thus, the method could be used for a determination of mineral analysis (e.g., iron containing components in silicates), and can also be of value in biological systems where cell components are to be determined. In such systems, of course, a microscope will be the appropriate optics system. Other appropriate systems for application of the method of the invention will occur to the skilled art worker.

The invention claimed is:

1. A method for remotely determining the concentration of a component in a mixture where said component has thermal characteristics different from other components in said mixture which comprises raising the temperature of the mixture, detecting and measuring the integrated thermal radiation from the heated mixture and relating the measured flux to the concentration of said component.

2. The method of claim 1 wherein the mixture is heated by infrared radiation.

3. A method for remotely determining the bitumen content of tar sands which comprises raising the temperature of said tar sands and detecting and measuring the integrated thermal radiation from the heated tar sands.

4. A method for determining the bitumen content of tar sands which comprises irradiating said tar sands with infrared radiation to increase the surface temperature of said tar sands between about 0.1° C. and about 2° C., remotely determining the integrated thermal radiation from said heated tar sands, and empirically relating the thermal radiation to bitumen concentration.

5. The method of claim 4 wherein the tar sands are moving.

6. A method for remotely determining the bitumen content of moving tar sands which comprises irradiating said tar sands with infrared radiation to increase the surface temperature of said tar sands, remotely determining the integrated thermal radiation from said heated tar sands by passing said radiation through a reflecting telescope and then through a chopper and a diaphragm at the focal plane of said telescope to a detector, a reference source of radiation being passed through said chopper to said detector alternately with the radiation from said heated tar sands, the output from said detector being fed to an amplifier which responds to the difference between the radiation from said tar sands and from said reference, and correlating the output from said amplifier to the content of bitumen in said tar sands.

7. The method of claim 6 wherein the tar sands are irradiated for a time period of from about 0.125 for about 20 seconds to raise the surface temperature of said tar sands from about 0.1° C. to about 2° C. and wherein the reference source is a black body.

8. The method of claim 7 wherein the detector is a lithium tantalate crystal.

9. The method of claim 7 wherein means responsive to a predetermined analytical value diverts said tar sands for special handling.

* * * * *